United States Patent [19]
Bruhis et al.

(10) Patent No.: US 8,452,910 B1
(45) Date of Patent: May 28, 2013

(54) CAPTURE OF USB PACKETS INTO SEPARATE USB PROTOCOL STREAMS BASED ON DIFFERENT USB PROTOCOL SPECIFICATIONS

(75) Inventors: Etai Bruhis, Palo Alto, CA (US); Gopal Santhanam, Sunnyvale, CA (US); Aki Niimura, Sunnyvale, CA (US)

(73) Assignee: Total Phase, Inc., Sunnyvale, CA (US)

( * ) Notice: Subject to any disclaimer, the term of this patent is extended or adjusted under 35 U.S.C. 154(b) by 256 days.

(21) Appl. No.: 12/909,762

(22) Filed: Oct. 21, 2010

(51) Int. Cl.
*G06F 13/36* (2006.01)
*G06F 13/40* (2006.01)

(52) U.S. Cl.
CPC .................................. *G06F 13/4027* (2013.01)
USPC ........................................... 710/315; 710/310

(58) Field of Classification Search
USPC .............................. 710/306–315, 8–19, 58–61
See application file for complete search history.

(56) References Cited

U.S. PATENT DOCUMENTS

| | | | |
|---|---|---|---|
| 7,996,586 B2 * | 8/2011 | Liu .................................. | 710/36 |
| 2003/0223486 A1 * | 12/2003 | Hsu ................................ | 375/224 |
| 2006/0095642 A1 * | 5/2006 | Hesse et al. .................... | 710/313 |
| 2010/0023649 A1 * | 1/2010 | Choi et al. ..................... | 710/14 |
| 2010/0049880 A1 * | 2/2010 | Santhanam et al. ............ | 710/15 |
| 2010/0169511 A1 * | 7/2010 | Dunstan et al. ................ | 710/16 |
| 2011/0022769 A1 * | 1/2011 | Hung et al. .................... | 710/313 |
| 2011/0131356 A1 * | 6/2011 | Devam et al. ................. | 710/105 |
| 2011/0191503 A1 * | 8/2011 | Kakish ............................ | 710/15 |
| 2011/0219163 A1 * | 9/2011 | Beadnell et al. .............. | 710/315 |
| 2011/0246681 A1 * | 10/2011 | Lai .................................. | 710/16 |
| 2012/0054376 A1 * | 3/2012 | Vaynberg et al. .............. | 710/18 |

OTHER PUBLICATIONS

LeCroy USB Protocol Suite User Manual. Manual Version 4.10. LeCroy Corporation. Sep. 2010. See Section 10.1.4: http://www.lecroy.com/Support/TechLib/registerPDF.aspx?documentID=5228.
Ellisys Better Analysis. USB Explorer 280 Analyzer User Manual. Version 1.0, Dec. 22, 2009p. 53, http://www.ellisys.com/products/download/usbex280a_manual.pdf.
SerialTek: BusXpert Micro Series USB 3.0 USB 2.0 Analyzer, 2008-2011 SerialTek, LLC. Key Features: 7th bullet point, http://www.serialtek.com/busxpert_micro_usb_analyzer.asp.
SerialTek: BusXpert MicroLite Series USB 3.0 USB 2.0 Analyzer, 2008-2011 SerialTek, LLC. 7th bullet point, http://www.serialtek.com/busxpert_microlite_usb_analyzer.asp.

* cited by examiner

*Primary Examiner* — Raymond Phan
(74) *Attorney, Agent, or Firm* — Van Pelt, Yi & James LLP

(57) ABSTRACT

Split capture of USB protocol streams is disclosed. A first set of packets associated with a first USB protocol and a second set of packets associated with a second USB protocol are received at a hardware protocol analyzer via a monitored bus. The first set of packets and the second set of packets are maintained as separate streams at the hardware protocol analyzer. The first set of packets and the second set of packets are transferred from the hardware protocol analyzer to an analysis computer via a first logical connection configured to transfer packets comprising the first set of packets and a second logical connection configured to transfer packets comprising the second set of packets.

24 Claims, 9 Drawing Sheets

US 8,452,910 B1

CAPTURE OF USB PACKETS INTO SEPARATE USB PROTOCOL STREAMS BASED ON DIFFERENT USB PROTOCOL SPECIFICATIONS

BACKGROUND OF THE INVENTION

The Universal Serial Bus (USB) protocol and associated specifications have evolved over time. The USB 2.0 specification was released in 2000 and provides a 480 Mbps data transfer rate, significantly higher than the original USB specification. More recently, the USB 3.0 specification has been released and USB 3.0 peripherals and other products have become available. USB 3.0 supports data transfer at rates up to ten times as fast as USB 2.0. USB 3.0 devices are backwards compatible with USB 2.0 devices and hosts. In some environments, for example a USB 3.0 hub, both USB 3.0 and USB 2.0 traffic may be observed on a single port.

Universal Serial Bus (USB) analyzers are used by manufacturers and other developers of USB devices, software (e.g., drivers), firmware, etc. to monitor and analyze communications on the Universal Serial Bus (USB). For example, communications between a target USB device and a target host to which the device has been connected via a USB port on the target host may be monitored to ensure the device is communicating properly with the target host and vice versa in accordance with applicable USB standards and protocols.

A hardware USB analyzer typically comprises a stand alone or other hardware device having a first set of connectors to enable the analyzer to be connected so as to be able to observe traffic between a target USB device and a target host; hardware and/or firmware to decode signals observed on the USB connection being monitored into USB packets; and hardware, logic, and/or an external connector to enable the analyzer to be connected to an analysis PC and to forward to the analysis PC.

BRIEF DESCRIPTION OF THE DRAWINGS

Various embodiments of the invention are disclosed in the following detailed description and the accompanying drawings.

DETAILED DESCRIPTION

Figure 1:
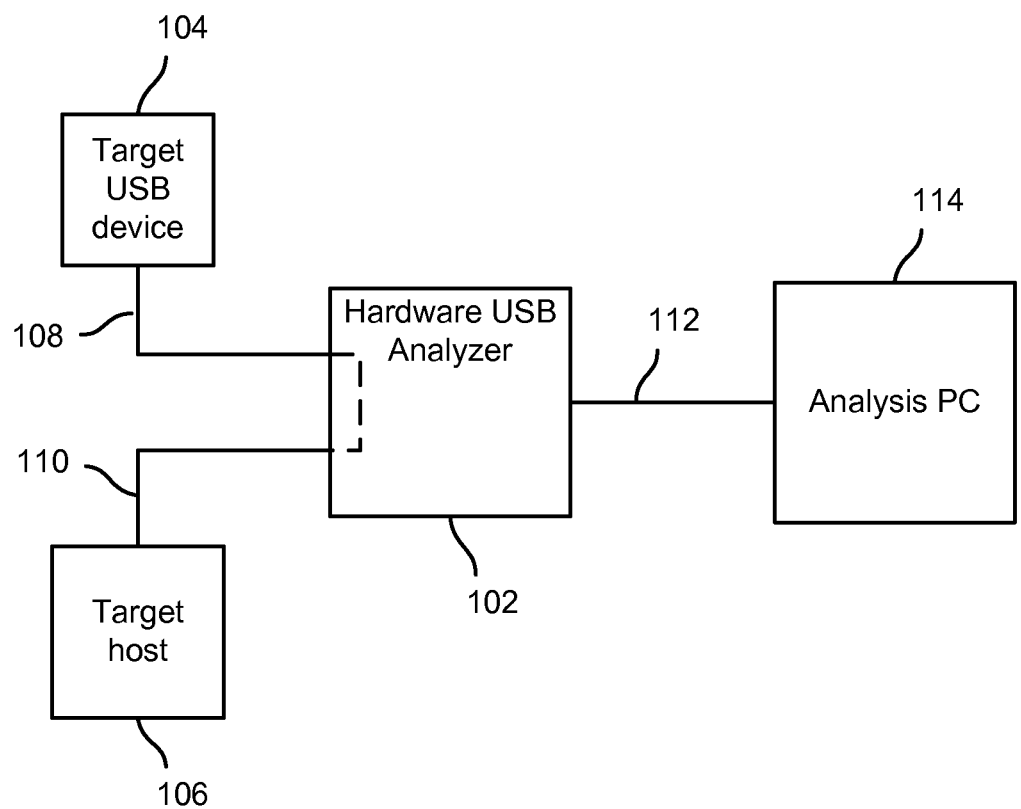
FIG. 1 is a block diagram illustrating an embodiment of a hardware USB analyzer.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Split capture of USB protocol streams is disclosed. In various embodiments, USB 2.0 and USB 3.0 data observed on a monitored bus are processed as separate streams by a USB hardware analyzer. Stream specific timestamps are applied to data comprising the streams, which are sent as separate streams, via separate logical connections, from the USB hardware analyzer to an analysis personal or other computer (e.g., an "analysis PC"). At the analysis PC, bus times on computed for packets comprising the two (or more) protocol specific streams. The packets are processed in bus time order and associated decoded (e.g., transaction level, class level) data is displayed to a user, e.g., via a user interface provided via a display device.

In some embodiments, a hardware analyzer uses separate circular buffers to store USB 2.0 and USB 3.0 data, respectively. Prior to "trigger", i.e., receiving an indication of specific data observed on the monitored bus that is to be provided to the analysis PC, due to the much higher data rate provided by USB 3.0, older data in the USB 3.0 buffer may be overwritten while USB 2.0 data observed on the monitored bus at or near the same time is still preserved. In some embodiments, a synchronization is performed to cause data in a first protocol stream (e.g., USB 2.0) associated with periods prior to the oldest available data remaining in a buffer associated with a second protocol stream to be discarded, prior to data being transferred to the analysis PC, to avoid transferring to the analysis PC data from the first protocol stream from periods for which contemporaneously observed data in the second protocol stream may have been overwritten.

In some embodiments, information concerning the two (or more) protocol streams and associated connections is used to facilitate ordering and otherwise processing packets at the analysis PC. For example, in some embodiments the hardware analyzer is connected to the analysis PC by a USB connection and an awareness of the size of USB request buffers (URBs) submitted at the analysis PC for data comprising the respective protocol streams to be transferred via is used at the hardware analyzer to ensure an orderly and coordinated flow of data for timely analysis at the analysis PC.

FIG. 1 is a block diagram illustrating an embodiment of a hardware USB analyzer. In the example shown, USB analyzer 102 is configured to monitor a USB connection between a target USB device 104 and a target host 106. A first USB cable/connector 108 connects the target USB device 104 to the analyzer 102; and a second USB cable/connector 110 connects the analyzer 102 to the target host 106. Examples of target USB devices include without limitation a printer, a mass storage device, and a human interface device (HID) such as a mouse or keyboard. Connected in the way shown in FIG. 1, the analyzer 102 receives USB signals communicated either by the target USB device to the target host or by the target host to the target device, enable the analyzer to monitor the bidirectional communications. Typically the analyzer is configured to listen passively, such that the target host and target device believe they have a direct USB connection between them. The analyzer 102 provides an analysis stream via an analysis stream output connection 112 to an analysis PC (or other computer) 114. In some embodiments the connection 112 is itself a USB connection between the analyzer 102 and the analysis PC 114. In various embodiments, the analysis PC 114 and target host 106 may comprises the same physical system, e.g., a PC to which the device 104 has been connected via the analyzer 102 and connections 108 and 110.

Figure 2:
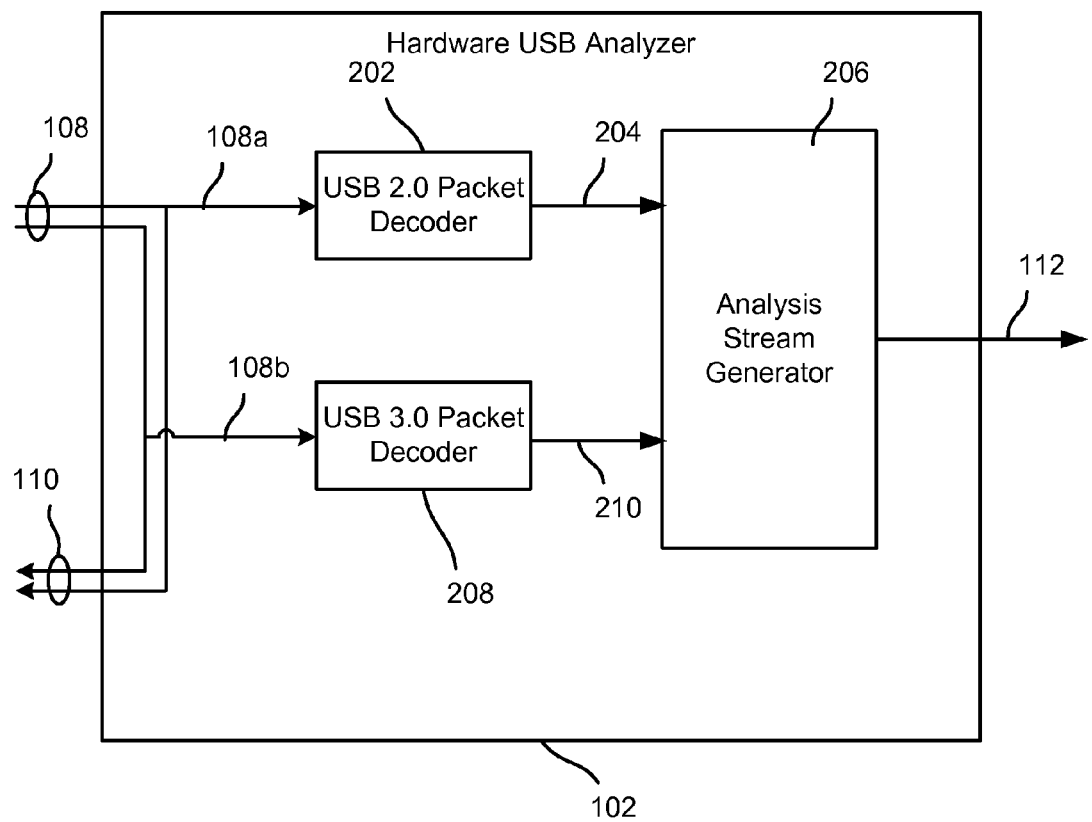
FIG. 2 is a block diagram illustrating an embodiment of a USB analyzer.

FIG. 2 is a block diagram illustrating an embodiment of a USB analyzer. In the example shown, hardware USB analyzer 102 includes separate USB 2.0 and USB 3.0 packet decoders 202 and 208, respectively. In the example shown, connection 108 comprises a set of USB 2.0 wires 108*a* connected to provide USB 2.0 signals to USB 2.0 decoder 202 and a separate set of USB 3.0 wires 108*b* connected to provide USB 3.0 signals to USB 3.0 decoder 208. USB 2.0 decoder 202 provides USB 2.0 packets via a connection 204 to analysis stream generator 206. Likewise, USB 3.0 decoder 208 provides USB 3.0 packets via a connection 210 to analysis stream generator 206. Analysis stream generator 206 is configured to buffer both streams separately. Packets observed on the monitored bus are stored in some embodiments as records ready to be transferred (upon occurrence of a trigger event) to the analysis PC via connection 112

In some embodiments, the connection 112 between the hardware USB analyzer 102 and the analysis PC 114 comprises a USB connection. A USB connection may include one or more logical endpoints, each connected to the host by a corresponding logical connection, sometimes called a "pipe". In some embodiments, separate endpoints are established on the analyzer 102 for the USB 2.0 and USB 3.0 data streams, respectively. This approach allows a single USB connection to be used to transfer the respective streams to the analysis PC as separate streams.

Figure 3:
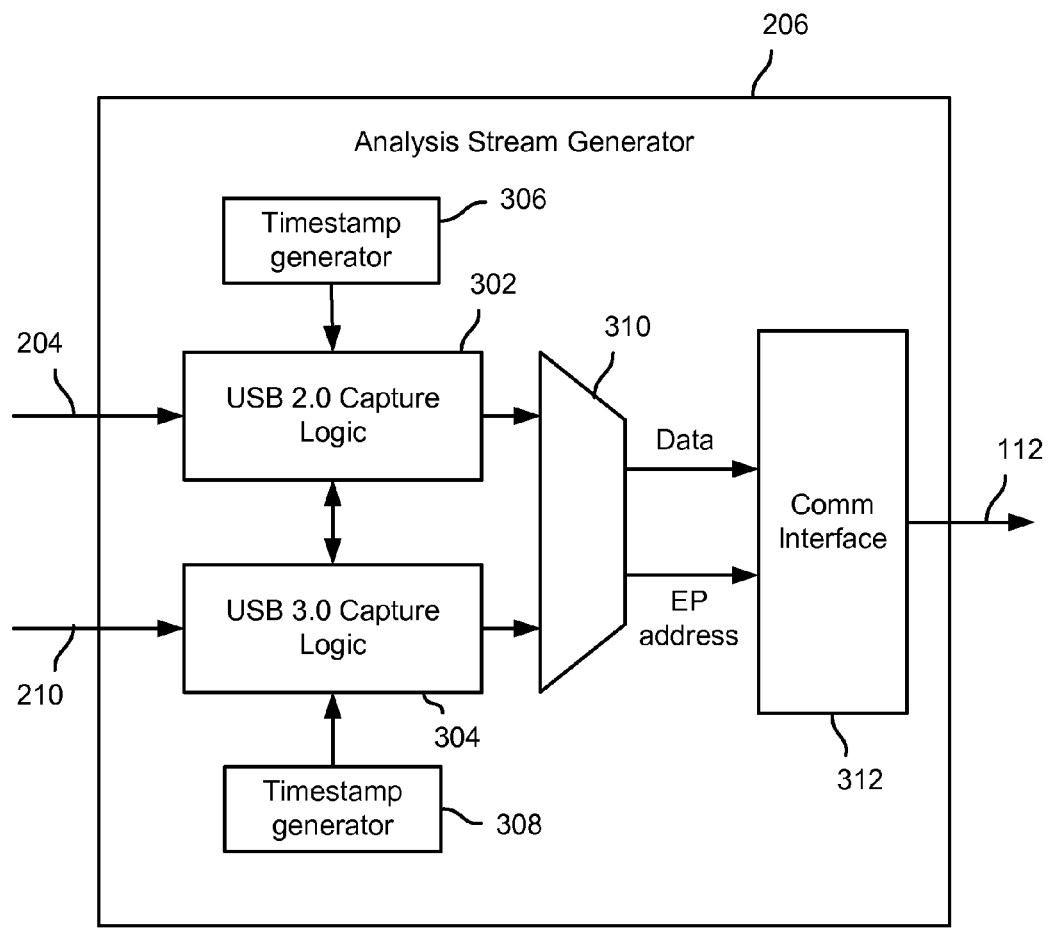
FIG. 3 is a block diagram illustrating an embodiment of an analysis stream generator.

FIG. 3 is a block diagram illustrating an embodiment of an analysis stream generator. In the example shown, the analysis stream generator 206 of FIG. 2 includes a USB 2.0 capture logic block 302 that receives via connection 204 USB 2.0 packets observed on the monitored bus and a USB 3.0 capture logic block 304 that receives via connection 210 USB 3.0 packets observed on the monitored bus. A USB 2.0 timestamp generator 306 provides timestamps to the USB 2.0 capture logic 302, and a USB 3.0 timestamp generator 308 provides timestamps to the USB 3.0 capture logic 304. In some embodiments, a separate 16-bit (or other) counter is used to provide for each of the streams (e.g., USB 2.0 and USB 3.0) a stream-specific analyzer timestamp. Each time the timestamp counter for a stream rolls over, a token or other data is inserted in that stream. The respective timestamps generated by the counters are not directly comparable, because the USB 2.0 and USB 3.0 streams have different data rates associated with them, which results in the respective counters being incremented at different rates. In some embodiments, the analysis PC is configured, e.g., through software, to use the 16-bit timestamps and rollover tokens for the respective separate streams to compute, at the analysis PC, a bus time at which each packet received at the analysis PC was observed on the bus (typically expressed as a 64-bit value), and to use the respective bus times of the respective USB 2.0 and USB 3.0 (or other) packets to sort the packets into bus time order in a merged and sorted stream, for further decoding and analysis at the analysis PC. While in the example shown in FIG. 3 separate timestamp generators are provided for each stream, in some alternative embodiments a single timestamp generator, such as single 16-bit counter, is used to provide timestamps for both streams. The USB 2.0 capture logic 302 and USB 3.0 capture logic 304 provide packets via a multiplexer 310 configured to forward data packets (including for each an associated endpoint address indicating a protocol stream with which it is associated) to a communication interface 312 configured to transfer the packets to an analysis PC via connection 112.

In various embodiments, maintaining the USB 2.0 and USB 3.0 (or other) data flows as separate streams at the hardware USB analyzer, as described herein, avoids delaying the processing of USB 3.0 data, which is transferred at a much higher rate, while USB 2.0 data is being processed. For example, if all data were treated as one combined flow at the hardware USB analyzer, then processing of a USB 2.0 packet could delay the processing of subsequently received USB 3.0 packets, since a number of USB 3.0 packets could be received while receipt of a single USB 2.0 packet is occurring. In some embodiments, the USB 2.0 and USB 3.0 (or other) data are maintained as separate streams throughout the hardware USB analyzer to shift to the more powerful analysis PC the tasks of computing bus times and merging the streams into a bus time sorted combined stream, thereby conserving computing and memory resources on the hardware USB analyzer.

Figure 4:
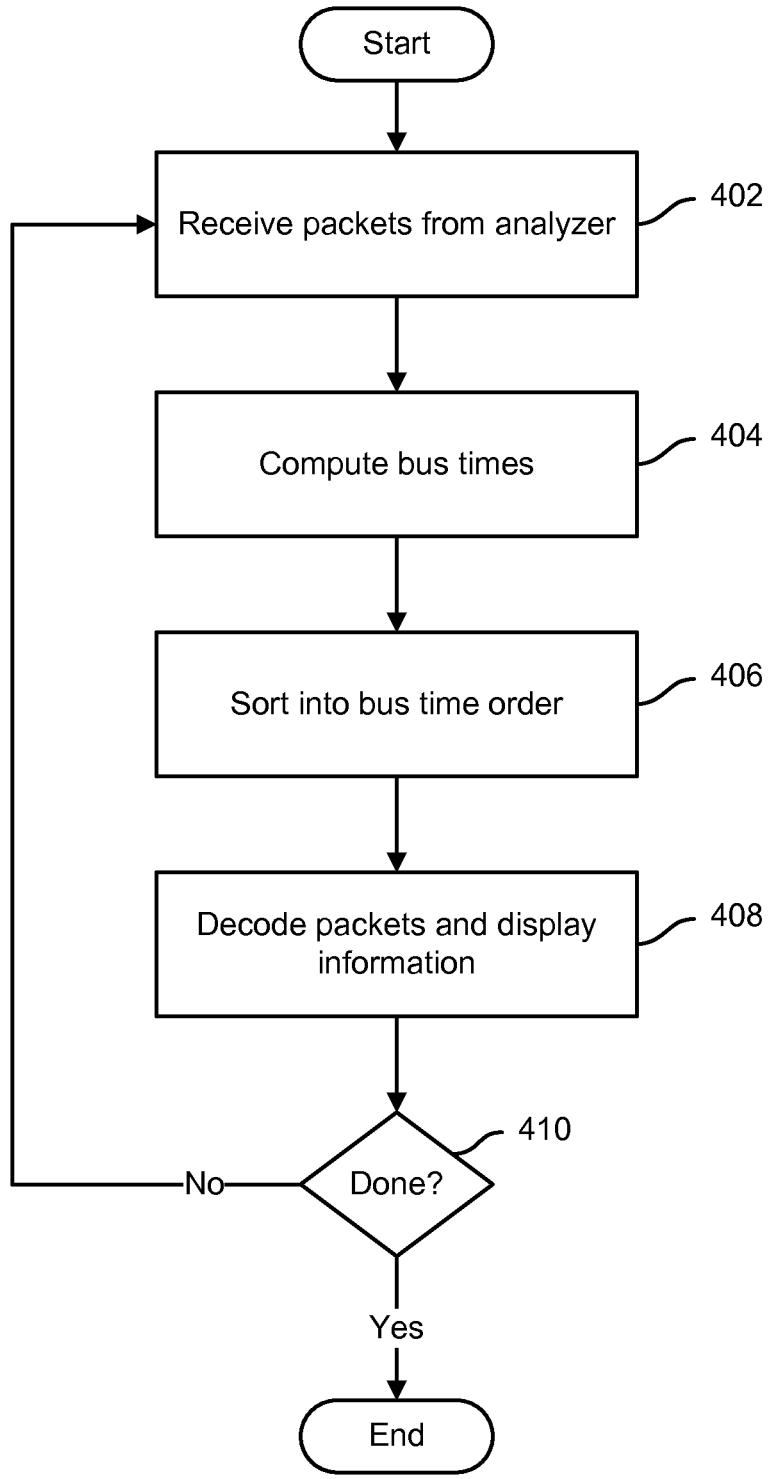
FIG. 4 is a flow diagram illustrating an embodiment of a process for merging USB protocol streams.

FIG. 4 is a flow diagram illustrating an embodiment of a process for merging USB protocol streams. In various embodiments, the process of FIG. 4 is implemented on an analysis PC such as analysis PC 114 of FIG. 1. In the example shown, packets comprising two or more USB protocol streams are received (402), for example at the analysis PC from the hardware USB analyzer. For each packet, an associated timestamp and stream-specific counter rollover token data included in the analysis stream by the hardware analyzer are used to computer for each packet an associated bus time at which the packet was observed on the monitored bus (404). The computed bus times are used to sort the packets comprising the respective streams into a single, merged stream in bus time order (406). The packets are decoded (e.g., to the USB transaction level, USB class level, etc.) and associated information is displayed to a user, e.g., in a user interface provided via a display device (408). The process continues until done (410), e.g., the hardware analyzer stops sending data and/or the user stops the analysis PC and/or software running thereon.

Figure 5:
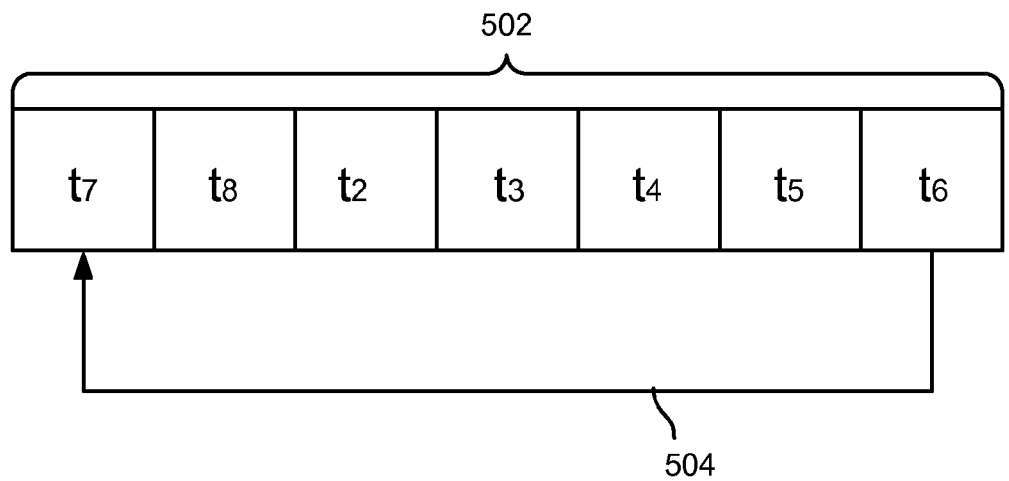
FIG. 5 is a block diagram illustrating an embodiment of stream-specific circular buffers.
Figure 5:
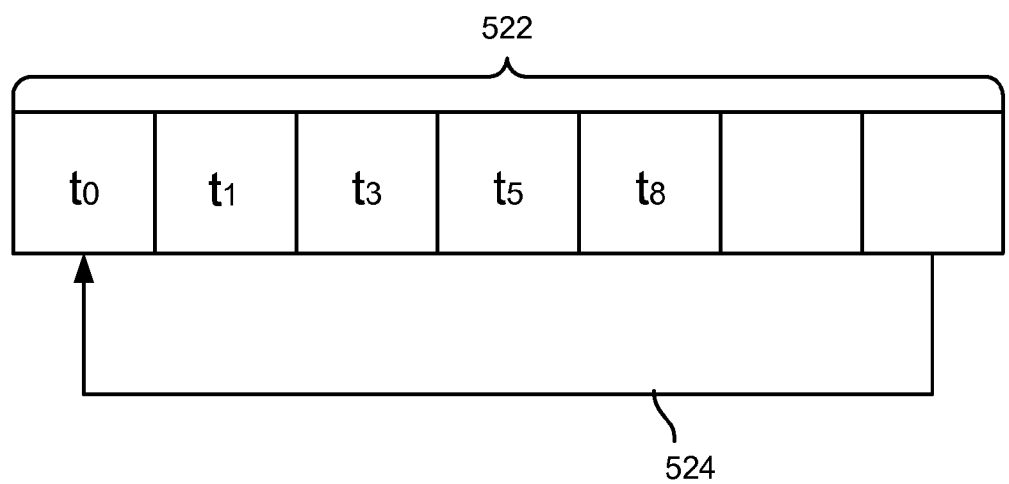

FIG. 5 is a block diagram illustrating an embodiment of stream-specific circular buffers. In various embodiments, stream-specific circular buffers such as those illustrated in FIG. 5 are used on a hardware USB analyzer to store packets observed on a monitored bus. In the example shown, a first circular buffer comprising a first set of storage locations 502 is configured to store USB 3.0 packets observed on the monitored bus. As indicated by arrow 504, once a packet (or other record) has been stored in a last storage location in the buffer (rightmost as shown), data stored previously in a first and if needed following storage locations is overwritten, so that the most recent data remains stored in the circular buffer. In the example shown, packets (or other records) associated with times t7 and t8 have been written over whatever may previously have been stored (prior to time t2) in the leftmost two storage locations as shown. In the example shown, a separate circular buffer comprising storage locations 522 is configured to store USB 2.0 packets observed on the monitored bus. As indicated by arrow 524, once a packet (or other record) is stored in a last storage location in the buffer (rightmost as shown), data stored previously in a first and if needed following storage locations would be overwritten, so that the most recent data would remain stored in the circular buffer. In the example shown, however, the circular buffer has not yet been filled. This may occur in practice due to the fact that many more USB 3.0 than USB 2.0 packets can be transferred in the same time period due to the much higher (10x) transfer rate provided by USB 3.0.

Referring further to FIG. 5, in various embodiments upon occurrence of a "trigger" event data observed on the monitored bus can be transferred to the analysis PC, decoded, and displayed to the user. Typically, a configured or otherwise prescribed amount of pre-trigger and post-trigger data are included. However, in the example shown there is a risk that the USB 2.0 packets observed at t0 and t1 respectively would be included in the capture, even though USB 3.0 packets observed at or near the same time may already have been overwritten. In various embodiments, synchronization ensures that there are not large periods at the beginning of the display of packets to the user that only show USB 3.0 or USB 2.0 information, giving the mistaken impression that only USB 3.0 or only USB 2.0 traffic was present on the bus. In addition, hardware-assisted synchronization saves the time to download the bus traffic that would have otherwise been discarded by the software such that this undesired display is avoided. Therefore, in some embodiments a synchronization process is performed to ensure that the data sent to the analysis PC, decoded, and displayed to the user does not include data from a first stream that was observed at a time for which corresponding data comprising a second stream may have been observed on the same monitored bus but subsequently overwritten.

Figure 6:
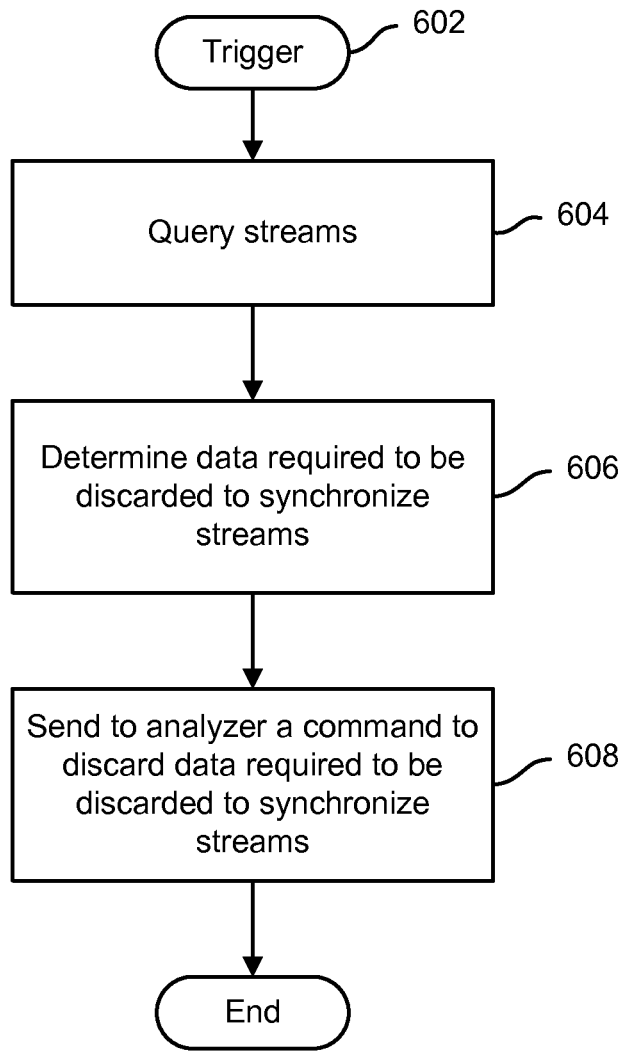
FIG. 6 is a flow diagram illustrating an embodiment of a process for synchronizing USB protocol streams.

FIG. 6 is a flow diagram illustrating an embodiment of a process for synchronizing USB protocol streams. In various embodiments, the process of FIG. 6 is implemented on an analysis PC and/or a hardware USB analyzer. In the example shown, upon occurrence of a trigger event (602) in an embodiment in which the process of FIG. 6 is implemented on an analysis PC the analysis PC queries the hardware USB analyzer to determine for each of the protocol streams a time data associated with an oldest packet remaining in the circular buffer associated with that stream (604). In some embodiments, the time data includes for each stream a number of times a stream-specific 16-bit counter rolled over between the start of capture (packets on the monitored bus being received and decoded) and receipt of the oldest packet still in that stream's buffer. For each stream, at the analysis PC a received time data associated with the oldest packet remaining in the hardware USB analyzer's circular buffer for that stream is converted to a bus time. Considering the example of two streams, one USB 3.0 and the other USB 2.0, the analysis PC determines whether for one stream or the other there remains in the circular buffer data for which corresponding data may have been overwritten in the other buffer. For example, in the example shown in FIG. 3, the analysis PC may determine that data from bus times prior to t2 remains in the USB 2.0 buffer but may have been overwritten in the USB 3.0 buffer. In some embodiments, the respective buffers are sized to be roughly proportional to the maximum speed of each protocol stream to minimize the amount of data that may need to be discarded to synchronize the streams. The analysis PC (or alternatively the hardware protocol analyzer) determines which data must be discarded (or ignored) in the USB 2.0 buffer to synchronize the streams (606). In this example, the analysis PC would determine that USB 2.0 packets observed at bus times prior to t3 would have to be discarded (or ignored). In an embodiment in which the process of FIG. 6 is implemented on an analysis PC, a command is sent to the hardware USB analyzer to tell the analyzer how much data is to be discarded (or ignored) (608). In an embodiment in which the process of FIG. 6 is implemented on a hardware protocol analyzer 608 is omitted.

In the example shown in FIG. 5, for convenience and clarity bus times are indicated for the respective packets; but recall that the bus time is not actually computed or stored at the hardware analyzer in various embodiments. Instead, a stream-specific 16-bit timestamp generated at the hardware analyzer, independently for each stream, is affixed. As the counter used to generate the timestamp rolls over, a token is inserted in the stream. In some such embodiments, the command sent by the analysis PC to the hardware analyzer identifies the data to be discarded (or ignored) in terms of a number of counter rollovers worth of data to discard.

Figure 7:
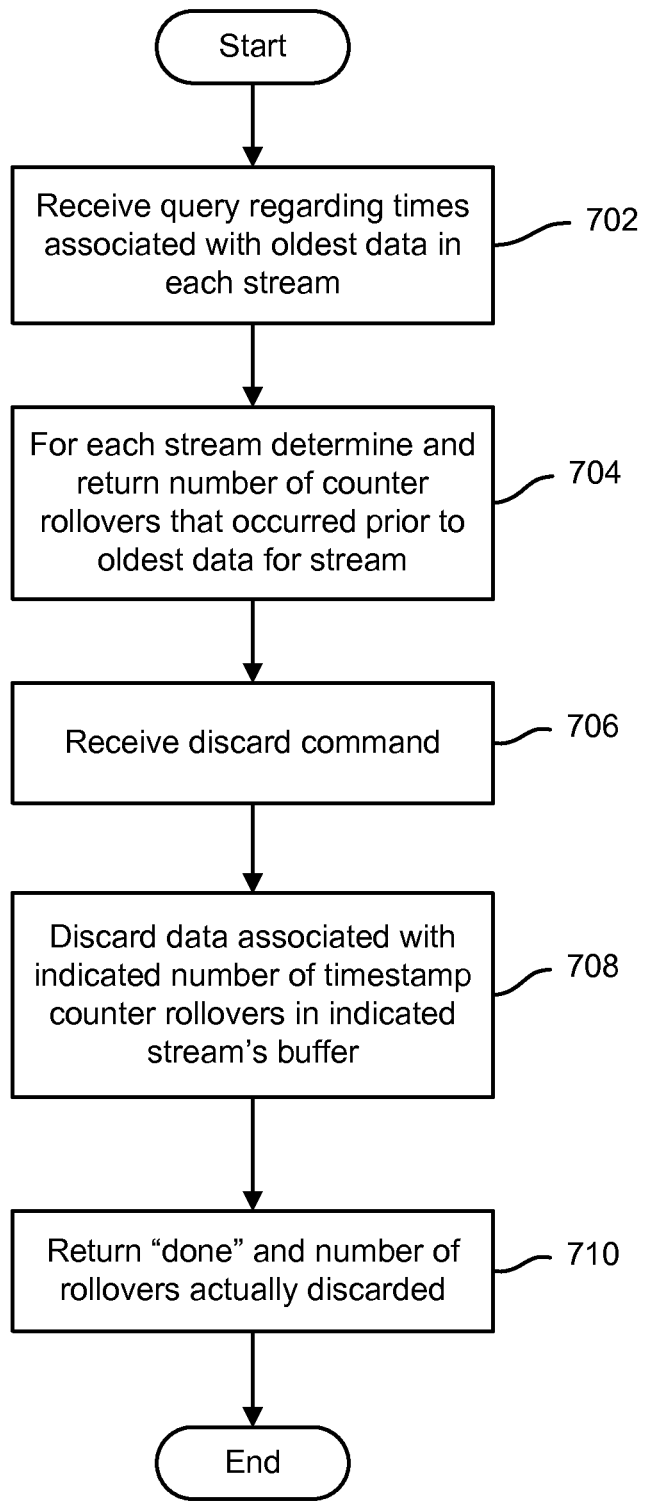
FIG. 7 is a flow diagram illustrating an embodiment of a process for synchronizing USB protocol streams.

FIG. 7 is a flow diagram illustrating an embodiment of a process for synchronizing USB protocol streams. In various embodiments, the process of FIG. 7 is implemented on a hardware USB analyzer. In the example shown, a query regarding time data associated with the oldest packet in each protocol stream is received (702). For each stream, a number of stream-specific counter rollovers that occurred prior to the oldest packet in the buffer for that stream is determined and returned in response to the query (704). On receiving from an analysis PC a command to discard data (706), the analyzer discards from the indicated buffer an indicated number of timestamp counter rollovers worth of data (708). In various embodiments, a token or other data is stored in the buffer each time the counter rolls over, and the analyzer uses the stored token or other data to identify a point in the circular buffer up to which data stored prior to that point is to be discard, e.g., written over or ignored. Once the indicated data has been discarded, a result is returned (710) indicating a number of rollovers actually discarded (since due to boundary conditions in some embodiments not all the data indicated in the command received at 706 may have been discarded) and transfer of data to the analysis PC begins.

Figure 8:
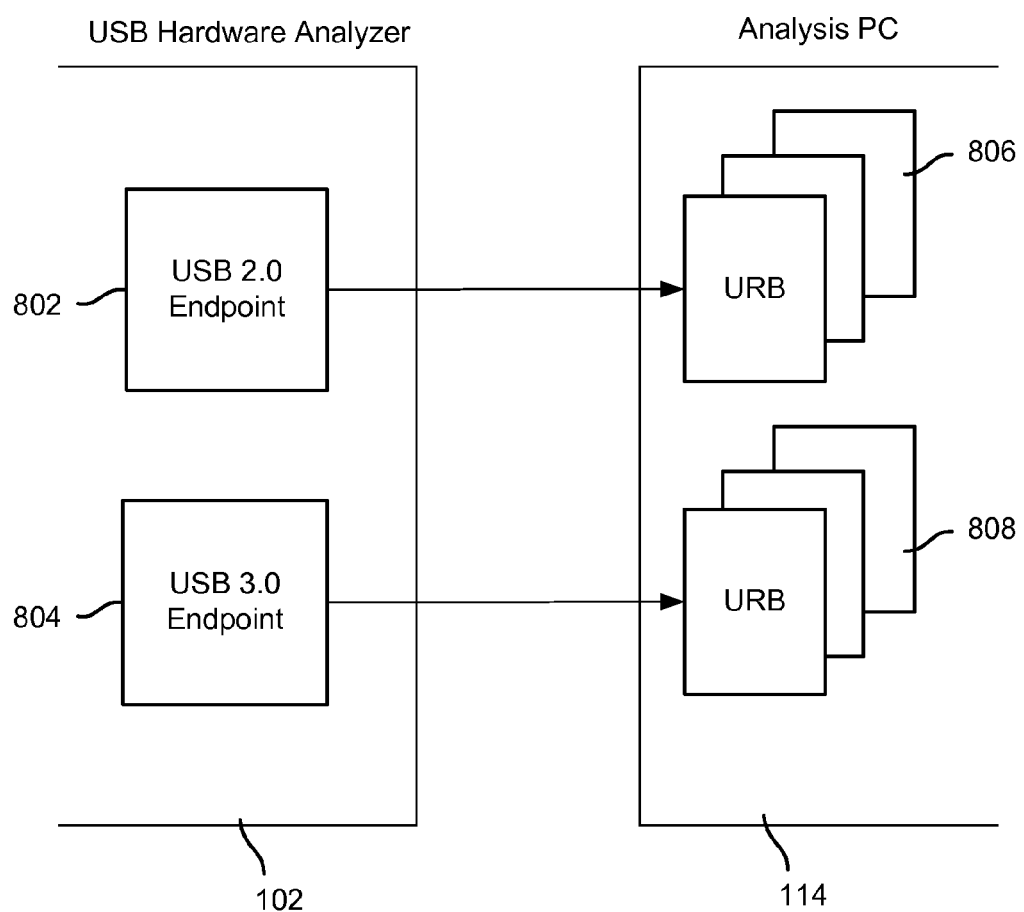
FIG. 8 is a block diagram illustrating an embodiment of a system for transferring data from a hardware USB analyzer to an analysis PC.

FIG. 8 is a block diagram illustrating an embodiment of a system for transferring data from a hardware USB analyzer to an analysis PC. In the example shown, USB 2.0 data and USB 3.0 data are transferred from analyzer 102 to analysis PC 114 independently via protocol-specific endpoints 802 and 804, respectively. A set of USB request buffers (URBs) 806 have been allocated ("submitted") on the analysis PC 114 to receive transferred data comprising the USB 2.0 stream. Likewise, a set of URBs 808 have been allocated to receive transferred data comprising the USB 3.0 stream. Typically, an URB is submitted by a USB device driver to facilitate a transfer of data to or from the device. As shown in FIG. 8, URBs may be associated with a particular endpoint (logical connection). Once an URB has been completely filled, or if not filled once a "short" packet comprising less than a maximum amount of data has been received, data transferred to an URB becomes available to be read and used by an application running on the analysis PC. In some embodiments, processing is performed on the hardware USB analyzer to ensure that URBs associated with the respective protocol specific streams are completed at or near the same time, to ensure that the most recent data from each stream is available to the software running on the analysis PC, for example to facilitate merging the protocol streams into a bus time-ordered combined stream for analysis.

Figure 9:
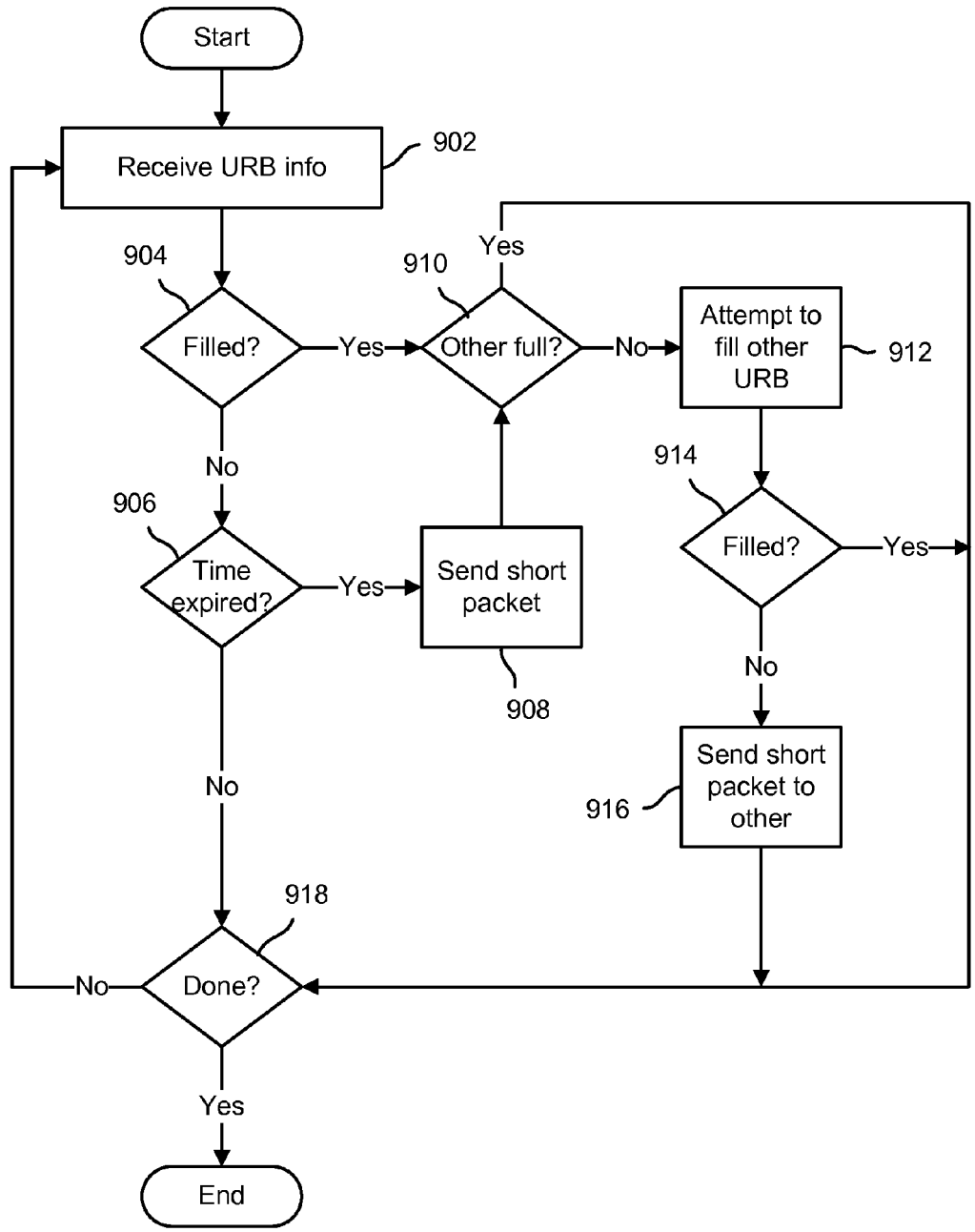
FIG. 9 is a flow diagram illustrating an embodiment of a process for filling USB request buffers (URBs) for two or more endpoints.

FIG. 9 is a flow diagram illustrating an embodiment of a process for filling USB request buffers (URBs) for two or more endpoints. In various embodiments, the process of FIG. 7 is implemented on a hardware USB analyzer. In the example shown, URB allocation information is received from the analysis PC (902). Examples include an indication that a new URB of an indicated size has been allocated. The analyzer tracks how much data has been transferred over how much time since the transfer of data to the URB to which data currently is being transferred began. If the current URB has not yet been filled (904) within a prescribed amount of time (906), a "short" packet (less than full payload of data) is sent (908). Once the current URB has been completed, either by being filled (904) or by virtue of a short packet having been sent (906, 908), it is determined whether the current URB for the other stream is full (910). If not, to ensure completion of the other stream's URB at or near the same time, an attempt is made to fill the other stream's URB (912) by writing data to the other URB from its associated buffer. If the other stream's URB cannot be filled within a prescribed time (914), a short packet is sent to the other stream's URB (916) to make the data transferred to the other stream's URB available to applications running at the analysis PC. Once the other stream's URB has been completed, because it was already full (910) or was successfully filled (912, 914) or by virtue of a short packet having been sent to it (916), the process returns to monitoring the URB(s) to which data is currently being transferred, until done (918). This approach ensures, for example, that the relatively lower amount of data transferred via USB 2.0 does not remain in an associated stream-specific URB while USB 3.0 data observed on the monitored bus has already become available for use by application code on the analysis PC, for example because a much greater volume of USB 3.0 data may have been communicated on the monitored bus within a capture window or relevant portion thereof, due to the much higher transfer rate provided by USB 3.0. In some embodiments this is important because the software cannot not fully process the USB 3.0 data that it has received until it receives at least some USB 2.0 data (or vice versa) so that the timestamps can be compared and the traffic can be sorted for the user in chronological time order.

Using techniques described herein, data sent using different USB protocols, e.g., USB 2.0 and USB 3.0 on the same monitored bus can be processed and analyzed efficiently, correctly, and in a timely manner, at least in part by processing the data as separate streams on a hardware USB analyzer and transferring the data as separate streams to an analysis PC where it can more efficiently be merged into a combined bus time ordered stream for higher level decoding and analysis.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of analyzing USB data, comprising:
receiving at a hardware protocol analyzer via a monitored bus a first set of packets associated with a first USB protocol and a second set of packets associated with a second USB protocol;
maintaining the first set of packets and the second set of packets as separate streams at the hardware protocol analyzer;
transferring the first set of packets and the second set of packets from the hardware protocol analyzer to an analysis computer via a first logical connection configured to transfer packets comprising the first set of packets and a second logical connection configured to transfer packets comprising the second set of packets; and
determining at the hardware protocol analyzer that a first USB request buffer (URB) associated with the first set of packets on the analysis computer has been filled or completed by sending a short packet; and taking action at the hardware protocol analyzer to cause a second URB on the analysis computer to be completed at or near the same time.

2. The method of claim 1, wherein the hardware protocol analyzer is configured to affix to packets comprising the first set a timestamp generated using a first protocol-specific counter associated with the first USB protocol and to affix to packets comprising the second set a timestamp generated using a second protocol-specific counter associated with the second USB protocol.

3. The method of claim 1, wherein the analysis computer is configured to merge packets comprising the first set and packets comprising the second set into a combined packet stream.

4. The method of claim 1, wherein the first USB protocol comprising the USB 2.0 protocol and the second USB protocol comprises the USB 3.0 protocol.

5. The method of claim 1, wherein the shared physical connection comprises a USB connection, and wherein the first logical connection comprises a first USB endpoint and the second logical connection comprises a second USB endpoint.

6. The method of claim 1, further comprising storing packets comprising the first set of packets in a first circular buffer at the hardware protocol analyzer and storing packets comprising the second set of packets in a second circular buffer at the hardware protocol analyzer.

7. The method of claim 1, wherein the analysis computer is configured to synchronize said first set of packets and said second set of packets with respect to a common starting bus time prior to said first set of packets and said second set of packets being transferred to the analysis computer.

8. The method of claim 1, wherein the hardware protocol analyzer is configured to synchronize said first set of packets and said second set of packets with respect to a common starting bus time prior to said first set of packets and said second set of packets being transferred to the analysis computer.

9. The method of claim 1, wherein the action includes attempting to fill the second URB by transferring packets comprising the second set of packets.

10. The method of claim 2, wherein the analysis computer is configured to use the respective timestamps affixed by the hardware protocol analyzer to the packets comprising the first and second sets to compute for each packet a bus time at which the packet was observed on the monitored bus.

11. The method of claim 3, wherein the analysis computer is configured to sort packets in the combined stream into a bus time order.

12. The method of claim 3, wherein the analysis computer is configured to decode packets in the combined stream in real time.

13. The method of claim 3, wherein the analysis computer is configured to decode packets to determine USB transaction level information.

14. The method of claim 3, wherein the analysis computer is configured to decode packets to determine USB class level information.

15. The method of claim 7, wherein the analysis computer is configured to synchronize the said first set of packets and said second set of packets at least in part by
   querying the hardware protocol analyzer to determine for each of the first and second sets an oldest timestamp associated with an oldest packet stored in the circular buffer associated with that set;
   receiving the respective oldest timestamps;
   computing for each at the analysis computer a corresponding bus time associated with an oldest packet in the set;
   determining at the analysis computer a determined circular buffer from which data is to be discarded at the hardware protocol analyzer and an amount or other identification of the data required to be discarded to synchronize said first set of packets and said second set of packets with respect to the common starting bus time; and
   sending to the hardware protocol analyzer a command to discard the determined data.

16. The method of claim 9, wherein the action further includes sending to the second URB a short packet if the second URB is not filled within a prescribed time of the first URB being completed.

17. The method of claim 12, wherein the analysis computer is further configured to display in user readable form information about the decoded packets.

18. A USB protocol analyzer, comprising:
   a USB connection configured to receive via a monitored bus a first set of packets associated with a first USB protocol and a second set of packets associated with a second USB protocol;
   a processor configured to transfer packets comprising the first set of packets to an analysis computer via a first logical connection and to transfer packets comprising the second set of packets to the analysis computer via a second logical connection; and
   a first circular buffer configured to store packets comprising the first set of packets and a second circular buffer configured to store packets comprising the second set of packets;
   wherein the processor is further configured to receive from the analysis computer a command to discard an indicated amount of data from either the first circular buffer or the second circular buffer to synchronize the first and second circular buffers with respect to a common starting bus time; and to discard from an indicated buffer indicated in the command an amount of data indicated in the command.

19. The USB protocol analyzer of claim 18, wherein the first logical connection comprises a first USB endpoint and the second logical connection comprises a second USB endpoint.

20. The USB protocol analyzer of claim 18, further comprising a first counter configured to provide a first series of timestamps for the first set of packets and a second counter configured to provide a second series of timestamps for the second set of packets.

21. The USB protocol analyzer of claim 20, wherein the analysis computer is configured to use the timestamps generated by the first and second counters to merge the first and second set of packets into a combined stream of packets in a bus time order.

22. A computer, comprising:
   a communication interface configured to receive from a hardware protocol analyzer via a first logical connection packets comprising a first set of packets associated with a first USB protocol and to receive via a second logical connection packets comprising a second set of packets associated with a second USB protocol, wherein the first set of packets is stored in a first circular buffer of the hardware protocol analyzer and wherein the second set of packets is stored in a second circular buffer of the hardware protocol analyzer; and
   a processor configured to merge received packets comprising the first set of packets and received packets comprising the second set of packets into a combined stream of packets in an order in which said packets were observed by the hardware protocol analyzer on a monitored bus; wherein the processor is further configured to send a command to the hardware protocol analyzer to discard an indicated amount of data from either the first circular buffer or the second circular buffer to synchronize the first and second circular buffers with respect to a common bus time, wherein the hardware protocol analyzer discards from the indicated buffer indicated in the command an amount of data indicated in the command.

23. A computer program product for analyzing USB protocol data, the computer program product being embodied in a computer readable storage medium and comprising computer instructions for:
   receiving from a hardware protocol analyzer via a first logical connection packets comprising a first set of packets associated with a first USB protocol and receiving via a second logical connection packets comprising a second set of packets associated with a second USB protocol, wherein the first set of packets is stored in a first circular buffer of the hardware protocol analyzer and wherein the second set of packets is stored in a second circular buffer of the hardware protocol analyzer;
   merging received packets comprising the first set of packets and received packets comprising the second set of packets into a combined stream of packets in an order in which said packets were observed by the hardware protocol analyzer on a monitored bus; and
   sending a command to the hardware protocol analyzer to discard an indicated amount of data from either the first circular buffer or the second circular buffer to synchronize the first and second circular buffers with respect to a common bus time, wherein the hardware protocol analyzer discards from the indicated buffer indicated in the command an amount of data indicated in the command.

24. A USB protocol analyzer, comprising:
   a USB connection configured to receive via a monitored bus a first set of packets associated with a first USB protocol and a second set of packets associated with a second USB protocol;
   a processor configured to transfer packets comprising the first set of packets to an analysis computer via a first logical connection and to transfer packets comprising the second set of packets to the analysis computer via a second logical connection, and wherein the processor is further configured to receive an indication that a first USB request buffer (URB) at the analysis computer associated with the first set of packets has been completed, and to respond to the indication by ensuring that a second URB at the analysis computer associated with the second set of packets is completed within a prescribed amount of time of the first URB being completed.

* * * * *